Figure 1:
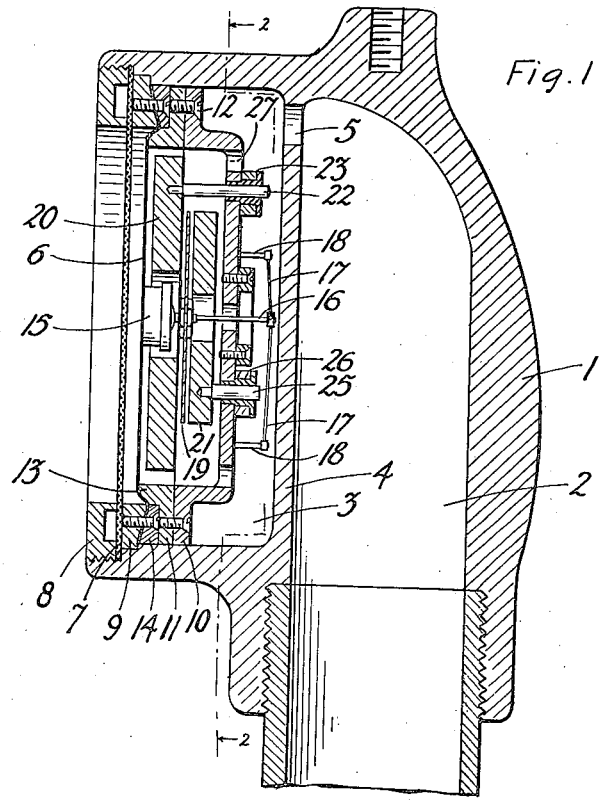

J. P. MAXFIELD.
VIBRATION DETECTOR.
APPLICATION FILED JUNE 24, 1919.

1,406,672.
Patented Feb. 14, 1922.

Inventor
Joseph P. Maxfield.
by J. E. Roberts
Atty.

UNITED STATES PATENT OFFICE.

JOSEPH P. MAXFIELD, OF MILLBURN, NEW JERSEY, ASSIGNOR TO WESTERN ELECTRIC COMPANY, INCORPORATED, OF NEW YORK, N. Y., A CORPORATION OF NEW YORK.

VIBRATION DETECTOR.

1,406,672.         Specification of Letters Patent.     Patented Feb. 14, 1922.

Application filed June 24, 1919. Serial No. 306,401.

*To all whom it may concern:*

Be it known that I, JOSEPH P. MAXFIELD, a citizen of the United States, residing at Millburn, in the county of Essex and State of New Jersey, have invented certain new and useful Improvements in Vibration Detectors, of which the following is a full, clear, concise, and exact description.

The invention relates to a vibration detector and more particularly to a device for detecting mechanical vibrations such as sound or similar vibrations and converting such vibrations into variations in an electrical circuit.

Devices of this general character, of which the ordinary telephone transmitter is a familiar example, have been extensively used. The detector of the invention, while it may be used with advantage as a telephone transmitter, is particularly designed for use as a submarine detector for the purpose of detecting vibrations propagated through liquids and more especially for the presence of marine or submarine vessels through the vibrations set up in the water by the machinery of such vessels.

The essentials of devices of the character described consist of a moving system and a current-varying device operated therefrom. The current variation may be obtained by varying either the resistance, capacity or the inductance of an electrical circuit, and, in general, this variation is obtained by the relative movement of two parts, at least one of which necessarily partakes of the movement of the moving system. The two relatively movable parts may be parts of a variable resistance device such as a microphone, or of a variable condenser, or they may be utilized to vary a magnetic field. The present invention is not, however, concerned with the particular type of current-varying device and any of the well-known types may be used. In the particular embodiment of the invention herein disclosed, the current-varying device takes the form of the ordinary carbon granule button.

It is an object of the present invention to provide a detector which is very sensitive to feeble vibratory effects and which will convert such vibrations with a minimum distortion into variations in an electrical circuit and which will be substantially free from resonant effects.

In order to attain this object, in accordance with one feature of the invention, both members of a current-carrying device are mounted so as to be capable of movement in response to the vibrations to be converted and both members are subjected to the action of damping means. In accordance with this feature of the invention, one member of the current-varying device is secured to and partakes of the movement of a vibration responsive body, such as a diaphragm, and the other member is connected thereto through a resilient connection. The diaphragm and member carried thereby, are damped sufficiently to prevent resonance when subjected to vibrations at or near its natural frequency and the said other member is damped so that while it is moved through its resilient connection with the diaphragm, this movement is much less in amplitude than that of the diaphragm, thus producing the necessary relative movement between the two members of the current-varying device.

It has heretofore been proposed to reduce the effect of resonance on the moving system of an acoustic device by so proportioning the moving system that the resulting natural frequency of the moving system is above the frequency of audible vibrations. It has also been proposed to accomplish the damping of the moving system by the damping effect of a body of air which is forced through a constricted passage or passages by the motion of the moving system.

In accordance with another feature, the moving system of the detector is damped by means of a body of air between it and a plate positioned in close face-to-face relation thereto, and in which an inertia member is mounted upon such moving system so as to be movable relative thereto by inertia, such inertia member being also damped to increase its resistance to motion at the higher frequencies without materially increasing its resistance to motion at the lower frequencies. More specifically stated, in accordance with this feature of the invention, there is mounted on the sound-responsive body or diaphragm, one electrode of a microphone button, the second electrode of which is also mounted from said diaphragm but so as to have movement relative thereto. In order to increase the resistance to movement of said second electrode, there is attached thereto, a damping vane or disc which is interposed between a pair of closely spaced plates, the movement of such vane being damped during excursions, by the intervening bodies of air.

In accordance with another feature of the invention, there is provided a damping plate which is interposed between the sound-responsive body or diaphragm and the vane attached to the inertia member in such a manner that the intervening bodies of air serve to damp the diaphragm, and inertia member respectively.

Figure 2:
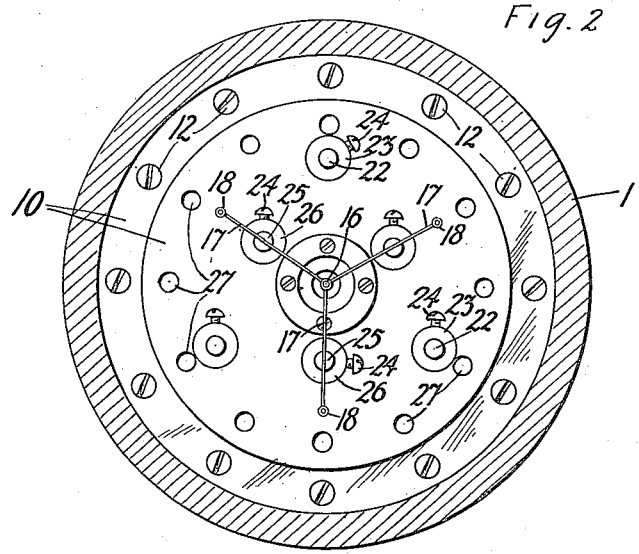

These and other features of the invention not specifically referred to above will more clearly appear from the following specification and the annexed sheet of drawing in which Fig. 1 is a longitudinal section of a vibration detector embodying the invention, and Fig. 2 is a section thereof along the line 2—2 of Fig. 1 looking in the direction of the arrows.

In the embodiment of the invention disclosed, the detector is designed for underwater use and it comprises a casing 1, which may be attached to a suitable submerged buoy or other submerged support. The casing 1 is provided with two open chambers 2 and 3 by means of a partition 4. The two chambers are placed in communication by means of the aperture 5 in the partition 4. The open end of the chamber 3 is closed by the diaphragm 6, the arrangement being such that when the casing is submerged, water will enter into the lower open end of the chamber 2 until the air included within the chambers 2 and 3 is compressed by an amount necessary to equalize the pressure of the water on the diaphragm 6. In this way, undue strains upon the diaphragm 6, due to the water pressure thereon, are eliminated. In order to shield the diaphragm 6 from foreign substances and mechanical injury, there is provided a pair of fine mesh wire screens indicated at 7. As shown in the drawing, the screens 7 are clamped between rings 8 and 9, ring 9 also forming a part of the securing and stretching means of the diaphragm 6. The entire device, including the diaphragm 6, may be removed from the casing 1 as a unit by removing the ring 8. A ring 11 is secured to the open end of a cup-shaped member 10 by means of the screws 12. This ring is provided with an upstanding rim 13 over which the diaphragm is stretched when the rings 9 and 14, between which the periphery of the diaphragm is clamped, are secured to the ring 11. The rings 9 and 14 may be secured to the ring 11 by means of suitable screws, not shown, which may be conveniently inserted through the rings 9 and 14 and extend into ring 11, the arrangement being such that by removing the ring 8 and the screen 7 the adjustment may be varied and consequently the tension or stretching of the diaphragm 6 may be varied for adjusting the natural frequency of the diaphragm. While the particular material used for the diaphragm is immaterial as far as the present invention is concerned, it might be mentioned that in the present invention it is made of a thin sheet of aluminum. As shown in the drawing, the edge of the ring 9 projects beyond the periphery of the cup 10, which projection fits against a shoulder formed in the open end of the cup so that when the ring is threaded into the end of the casing, the entire device is securely mounted therein. Secured to the diaphragm 6, usually by soldering or in any other well-known way, is an ordinary small microphone button. This consists of a cylindrical chamber in which there is one electrode secured to the diaphragm 6 and another electrode mounted in the open end of the cylindrical chamber by means of the usual flexible mica diaphragm, not shown. Between the two electrodes, there is interposed a mass of granular carbon or other resistance-varying material. Projecting from the electrode which is mounted on the flexible diaphragm is the stem 16. This stem 16 is attached at its outer end by means of light flexible wires 17 to three posts 18, mounted on the rear wall of the cup 10. The purpose of the three wires referred to is to constrain the motion of the stem 16 and the electrode associated therewith transverse to the axis of the stem, the diaphragm upon which the electrode is mounted and the three wires serving as a so-called parallel motion arrangement. Secured to the stem 16, adjacent the electrode, is the damping disc or vane 19. This disc may be conveniently attached to the stem by means of a pair of clamping nuts which are threaded on the stem 16 on either side of the damping disc. This arrangement permits a certain amount of adjustment of the vane 19. It is obvious that the vane 19, since it is made of light material and has little mass, and as the electrode attached to the stem 16 also has little mass, the inertia of these parts is comparatively small. In order, however, to increase the resistance to motion of these assembled parts, there is provided a pair of damping plates 20 and 21. The damping plate 20 is adjustably mounted upon a plurality of pins 22 which extend through thimbles 23 and are adjustably clamped therein by means of screws 24. Similarly, the damping plate 21 is mounted upon spindles 25 which extend through thimbles 26 on the cup member and are also held in adjusted position by means of screws 24. The thickness of the damping plate 20 is so chosen that one face of it is in very close parallel relation to the diaphragm 6 and the other face is in very close parallel relation to the vane 19. The damping plate 21 is so adjusted that its face is in closely spaced parallel relation with the other side of the vane 19. Since the vane 19 and the damping plates 20 and 21 are all adjustable, it is obvious that the spacing of these members may be adjusted to any desired values. In order to provide an exit for the air imprisoned between the various surfaces of the damping plates and the diaphragm and the vane, the damping plates are provided with central apertures and are so proportioned that a considerable space is provided between their peripheries and the interior of the casing. The back of the casing is also provided with apertures 27, which also permit the free circulation of the air included within the cup 10.

The operation of the device may be explained briefly as follows: Assuming that the casing 1 has been submerged and that the pressures on the opposite sides of the diaphragm 6 have been approximately equalized, sound or other vibrations propagated through the water will impinge upon the diaphragm 6. Inasmuch as the diaphragm 6 is stretched and is highly damped as will presently appear, the diaphragm 6 will follow the received vibrations very closely. The vibration of the diaphragm 6 causes relative movement between the electrodes of the button 15. This is apparent since one of the electrodes is fixedly secured to the diaphragm 6, while the other is movably mounted thereon and is caused to lag behind the vibrations of the diaphragm 6, both by the inherent inertia of the parts secured to the movable electrode and due to the resistance to motion of such parts caused by the damping exerted on the vane 19 during each excursion of the movable part. It will be observed that the diaphragm 6, causes the movement of the air between diaphragm 6 and the damping plate 20, and between either side of the vane 19 and the damping plates 20 and 21. Due to the viscosity of the air, this movement will offer resistance to the movement of the diaphragm and vane, and will absorb a portion of the energy due to the vibration of these parts. This energy absorbing effect will obviously serve to damp the movement of the diaphragm 6 and damp the movement of the vane 19. The relative movement between the two electrodes of the button 15 brought about by the vibration of the diaphragm 6 may be utilized to vary the resistance in the electrical circuit which contains such electrodes and the resistance very material included between them. It is obvious, however, that as far as the present invention is concerned, the microphone button may be replaced by some other form of current-varying device to vary either the capacity or the inductance of the electrical circuit. Familiar examples of devices of this character are known in the art as condenser and magnetic transmitters.

What is claimed is:

1. A vibration detector comprising a vibration-responsive body, a current-varying device supported thereby comprising a part movable relatively to the responsive body, a three-point suspension for restricting the movement of such relatively movable member to the direction of motion of the responsive body, and means independent of the inertia of the relatively movable part to damp the movement of such part from both sides thereof.

2. A vibration detector comprising a vibration-responsive body, a current-varying device supported thereby, one part thereof movable relatively to the responsive body, a vane member attached to the relatively movable part, and means disposed on each side of said vane member to dampen its movement in that direction.

3. A vibration detector comprising a diaphragm, a current-varying device supported thereby, one part thereof moving coincidentally with the diaphragm and another part moving consequently thereto in response to the vibrations of the diaphragm, a vane member attached to the second-mentioned moving member, a damping plate interposed between, and damping the movement of the vane and the diaphragm, and another damping member closely adjacent to another surface of the vane to further damp the movement of the second-mentioned moving part.

4. A vibration detector comprising a diaphragm, a current-varying device supported thereby, one part thereof moving relatively to the diaphragm, means to damp the movement of the diaphragm, additional means to damp the movement of the relatively movable part, and adjustable means for varying the effectiveness of each of the damping means.

In witness whereof, I hereunto subscribe my name this 17th day of June A. D., 1919.

JOSEPH P. MAXFIELD.